July 25, 1961 J. D. SMITH 2,993,350
ICE CREAM FREEZER
Filed July 22, 1959

INVENTOR.
Joe D. Smith.
BY Wood, Herron & Evans.
ATTORNEYS.

United States Patent Office 2,993,350
Patented July 25, 1961

1

2,993,350
ICE CREAM FREEZER
Joe D. Smith, 7836 Dearborn Court, Cincinnati, Ohio
Filed July 22, 1959, Ser. No. 828,818
2 Claims. (Cl. 62—342)

This invention relates to ice cream freezers and more particularly to a motor driven ice cream freezer adapted to operate in the freezing compartment of a household refrigerator.

The ordinary ice cream freezer is the familiar hand-powered device having a metal canister in which an ice cream mix is contained, a surrounding vessel holding an ice water bath to freeze the ice cream mix, "paddles" rotating within the can to agitate the mix, and drive means for the paddles, usually comprising a crank handle and gear train.

The present invention employs a new system of agitation whereby rotating paddles and the like are obviated. By virtue of the agitation system utilized, the freezer can be operated by a low-powered motor. It is particularly suited to operate in the freezing compartment of an ordinary home refrigerator, the motor drive being connected to it by a unique coupling. Thus, the invention at once eliminates the need for laborious hand-turning to make home-made ice cream and the need for inconvenient ice-water baths to induce freezing.

In the adaptation of the ice cream freezer to be operable in conjunction with a refrigerator, the problem has been two-fold. First, the bulk inherent in a one gallon size ice cream freezer, the usual size. requires much of the available space in the freezing compartment of the refrigerator. Consequently, it has been an object of this invention to provide a freezer which is operable in such a compartment but which is removable from it when not in use.

The second problem heretofore existing has been one of power requirements. As will be familiar to anyone who has ever cranked the paddles of a freezer, as the ice cream in the container progressively freezes, it becomes increasingly difficult to rotate the paddles in the ice cream until, at length, rotation is very difficult if not impossible when the freezing process is nearly completed. Where the freezer is motor driven, it has heretofore been necessary to utilize a relatively powerful motor with speed reduction means to rotate the paddles. A clutch was often use to prevent overloading the motor. Inevitably such things added considerably to the cost of the freezer. In the necessarily limited environment of a refrigerator, such means have tended to become prohibitive. It has therefore been another object of this invention to provide a new method of agitating the ice cream mix in the freezer which does not require a powerful drive unit or clutch, and which enables the invention to be readily operable in a refrigerator.

Another object of the invention has been to provide an inexpensive motor driven ice cream freezer which may readily be incorporated in an existing refrigerator.

These and other objects of the invention will be apparent from the accompanying drawings, in which:

FIGURE 1 is a perspective view partly broken away, showing an ice cream freezer embodying the principles of this invention installed in the freezer compartment of a refrigerator;

2

Figure 1:
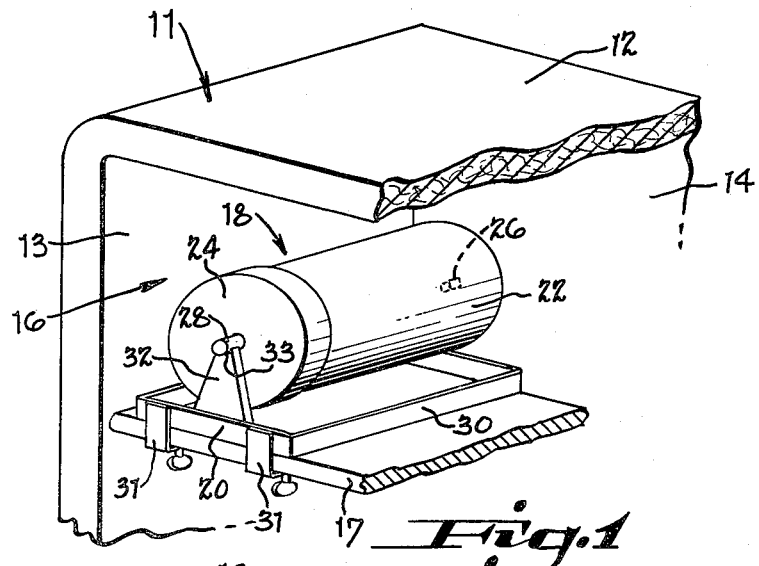
Figures 2, 4:
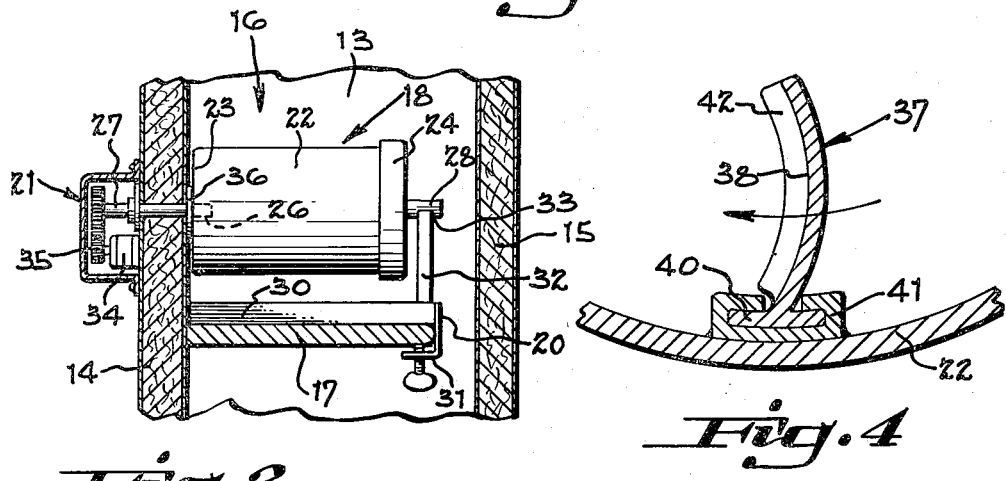
FIGURE 2 is a partial vertical section through a refrigerator in which the ice cream freezer has been installed.
FIGURE 4 is an enlarged vertical section taken on line 4—4 of FIGURE 3, illustrating the agitator blade.

The general manner in which the ice cream freezer is installed in a freezer compartment is best shown in FIGURES 1 and 2. A refrigerator of standard design is denoted generally by 11, the cooling mechanism of which is not shown. The refrigerator has a top 12, a side wall 13, and a rear wall 14, insulated to retain the desired low temperature. The door of the refrigerator, hinged at one side, is designated by the numeral 15.

The ice cream freezer is siuated in the freezing compartment 16 of the refrigerator. Usually the freezing compartment is located near the top of the refrigerator, although occasionally it is located elsewhere. In either event, the location of the freezing compartment is not important for purposes of the invention; it is requisite that there be available in its sufficient space in which to operate the ice cream freezer.

The ice cream freezer resides on a food shelf 17 in the freezing compartment 16. The freezer is composed of a rotatable container 18, a mounting frame 20 which supports the container 18 in a horizontal position in the freezing compartment and in which the container may rotate, and a motor drive 21 for rotating the container.

Figure 3:
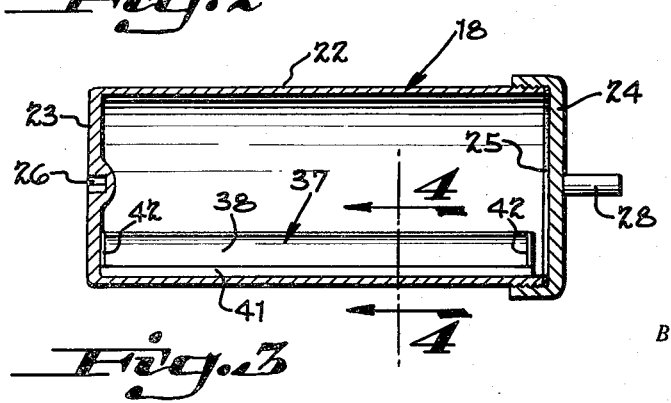
FIGURE 3 is a vertical section through the container of the ice cream freezer.

The container itself is best shown in FIGURE 3. It comprises a hollow cylindrical can 22 having a bottom 23 at one end and is open at the other end. A removable cap 24 forms a closure for the open end of the container so as to hold the ice cream mix in the container during freezing. So that the ice cream may easily be removed from the container once it has been frozen, it is preferable, although not necessary, that the cap 24 be of the screw-on type illustrated in the drawings, engaging threads presented on the outside of the can. A gasket 25 is preferably provided on the inside of the cap so that a water-tight seal is effected when the cap is screwed onto the container.

The container and lid may be of any size, the usual size being sufficient to hold one gallon of ice cream. To enable the freezer to be installed in small freezing compartments, it may be necessary, for example, to make the container relatively short with a relatively large diameter. The cylindrical shape specified is the most convenient shape for the freezer because of its symmetry and because the contents of the container may most easily be removed from a cylindrical shape. Furthermore, a water-tight cap can be most easily fixed to a cylindrical container. The container and cap may be fabricated from metal or plastic. Aluminum is an excellent material because of its excellent heat conductivity, light weight and durability.

Formed in the bottom of the can is a socket 26 adapted to engage the drive shaft 27 of the motor with which the freezer is rotated. In order to facilitate coupling the shaft to the socket 26, it is preferred that the socket and drive shaft be square in section whereby the shaft can be interlockingly engaged with the socket to impart rotation to the can. The drive shaft 27, in addition to rotating the can, also supports the bottom end (23) of the container.

A bearing for the cap end of the container is provided in the form of an axially protruding stub or pivot 28. This pivot rests in a journal presented by the frame, as will be subsequently specified, so that the container is rotatable about a horizontal axis. It should be noted that the distance from the bottom 23 of the container to the tip of the pivot 28 must be less than the inside depth of the freezing compartment 16 in which the freezer is to be installed.

The frame 20 by which the freezer is supported consists simply of a rectangular brace 30 adapted to butt rearwardly against the back wall 14 of the freezing compartment and extending forwardly to the front edge of the food shelf 17. Along its front edge, and elsewhere if desired, the frame may be secured to the food shelf by C-clamps 31 or other suitable means. Extending upwardly from the front portion of the frame is a bracket 32 having a pivot journal 33 in which the pivot 28 of the can can rotate. This journal 33 may consist simply of a semi-circular bearing in which the pivot is held seated by force of gravity. The frame, it can be seen, is simply a support to hold the pivot on the canister in proper relationship with the motor drive. Alternatively, the pivot 28 could be held simply by an upstanding bracket clamped directly to the food tray.

The motor drive 21 which rotates the freezer about its axis of symmetry comprises a low powered motor 34, speed reduction gears 35 and a drive shaft 27 engageable with the socket 26 on the bottom of the container. Because of space limitations inside the refrigerator, it is preferable that the motor 34 be mounted on the outside rear wall 14 of the refrigerator with its drive shaft extending through the wall and into the freezing compartment. A grommet 36 or other sealing device may be placed around the drive shaft 27 inside the refrigerator as insulation.

Because of the agitating means employed, which are described subsequently, the motor only rotates the can about a horizontal axis; it does not rotate paddles or the like within the container. Consequently, the motor itself may be of relatively small size, providing only such power as is necessary to overcome bearing friction. Thus, the invention does not call for elaborate gear systems to counter-rotate paddles inside the container, nor does it necessitate the use of a clutch to prevent overloading of the motor.

As noted, it is usually most convenient to install the motor at the rear of the refrigerator, the container being situated with its cap 24 outermost. However, in certain circumstances it might be desirable to locate the motor elsewhere. In such instances motor force could be transmitted by a right angle or other gear arrangement to the container. Alternatively, the motor might be connected to the container by a pulley or might drive a gear directly attached to the container. In any event, the location of the motor and method of transmitting rotation to the container is not intended to limit the scope of the invention.

An important feature of the invention resides in the novel agitator for stirring the ice cream mix in the container. This agitator is best shown in FIGURE 4. It comprises a longitudinally curved blade 37 attached along one edge to the inside wall of the container 22 so as to be rotatable with the container. The blade 37 extends the entire length (or depth) of the container and in width is somewhat less than the radius of the container.

The manner in which the agitator mixes the ice cream solution is as follows:

When the ice cream mix is placed in the container, the cap screwed on and the container seated horizontally in the frame, the heavier ingredients of the mix sink to the bottom of the container. (The heavy ingredients of the mix are sugar, fruits and the like.) As the container is rotated about a horizontal axis these materials tend to remain at lowest point in the container. However, as the container rotates, the blade 37 scoops through the heavy materials and distributes them with a swirling motion throughout the mix. Although a straight (non-curved) blade could be used, the curvature of the blade increases this effect. The curvature of the blade should be such that the concave surface 38 of the blade first engages the heavy materials as the can is rotated, as shown.

As a convenient means of removably attaching the blade to the inside of the container, the blade is T-shaped, having a lengthwise portion 40 disposed angularly with respect to the curved portion 37. This portion 40 is engageable with a C-shaped member 41 secured to the inside of the can whereby, with the cap 24 removed, the blade 37 can be slid longitudinally into or out of the slot 41. It is preferable that the blade be removable from the can to facilitate the removal of ice cream from the can.

To increase the agitating effect of the blade, end portions 42 of the blade are bent at right angles to the blade 37 to hold the heavy materials from moving off the ends of the blade.

So effective is the operation of this freezer that a gallon of ice cream can be produced in approximately 45 minutes with the can rotating at 300 r.p.m.

Because of the manner in which the agitator operates, it is requisite that the container rotate about a horizontal axis. In a container so oriented, however, the agitator functions as effectively as paddles yet consumes far less power. In addition, it may be more easily removed from the mix and is less expensive to produce.

While I have described the freezer of my invention as situated in the freezing compartment of a refrigerator, it will be appreciated that it might equally well be operated in any environment of suitable low temperature. Furthermore, if so desired, it might be rotated by manual means rather than by the motor described, its principle remaining the same.

Having described my invention, I claim:

1. An ice cream freezer for use in a refrigerator having a freezing compartment including a food shelf, said ice cream freezer comprising, a hollow cylindrical container closed at one end, a screw-on cover fitted with a gasket for the other end of said container, a support removably securable to said food shelf inside said compartment, said support presenting bearings whereby said container may be rotated in said bearings about a horizontal axis, a longitudinally extending agitator disposed inside said container, said agitator comprising a transversely curved blade portion and a longitudinal mounting portion disposed angularly with respect to said blade portion, C-shaped longitudinal slot means provided on the inside wall of said container, said mounting portion being receivable in said slot means to removably mount said blade to said container for rotation therewith, a motor drive unit mounted on the outside of said refrigerator adjacent said freezer compartment, said drive unit having a drive shaft extending through the wall of said freezer compartment, said container having a coupling at one end for engaging said drive shaft in driven relationship therewith whereby said container is rotated about said bearings when said motor unit is energized.

2. An ice cream freezer for use in a refrigerator having a freezing compartment including a food shelf, said ice cream freezer comprising, a hollow cylindrical container closed at one end, a screw-on cover fitted with a gasket for the other end of said container, a support removably securable to said food shelf inside said compartment, said support presenting bearings whereby said container may be rotated in said bearings about a horizontal axis, a longitudinally extending agitator disposed inside said container, said agitator comprising a transversely curved blade portion and a longitudinal mounting portion disposed angularly with respect to said blade portion, C-shaped longitudinal slot means provided on the inside wall of said container, said mounting portion being receivable in said slot means to removably mount said blade to said container for rotation therewith, said blade portion having ends which extend right angularly forwardly with respect to the remainder of said blade portion, a motor drive unit mounted on the outside of said refrigerator adjacent said freezer compartment, said drive unit having a drive shaft extending through the wall of said freezer compartment, said container having a coupling at one end for engaging said drive shaft in driven relationship therewith whereby said container is rotated about said bearings when said motor unit is energized.

References Cited in the file of this patent

UNITED STATES PATENTS

| | | |
|---|---|---|
| 2,210,366 | Godfrey et al. | Aug. 6, 1940 |
| 2,233,975 | Epperson | Mar. 4, 1941 |
| 2,755,073 | Woyth | July 17, 1956 |